Figure 1:
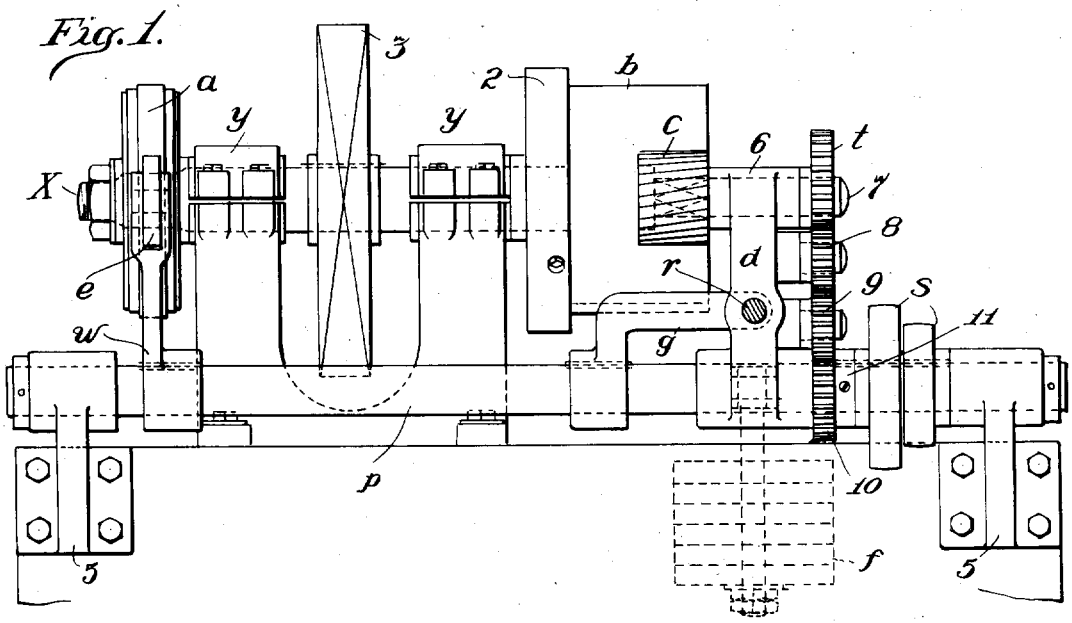

F. W. LANCHESTER.

MANUFACTURE OF PISTON PACKINGS.

APPLICATION FILED FEB. 4, 1918.

Reissued May 6, 1919.

14,644.

2 SHEETS—SHEET 1.

Inventor

Frederick William Lanchester by Gillson & Gillson

Attorneys

F. W. LANCHESTER.

MANUFACTURE OF PISTON PACKINGS.

APPLICATION FILED FEB. 4, 1918.

Reissued May 6, 1919.

14,644.

2 SHEETS—SHEET 2.

Inventor

Frederick William Lanchester

By Gillson & Gillson

Attorneys.

UNITED STATES PATENT OFFICE.

FREDERICK WILLIAM LANCHESTER, OF LONDON, ENGLAND, ASSIGNOR TO PISTON RING COMPANY, OF MUSKEGON HEIGHTS, MICHIGAN, A CORPORATION OF MICHIGAN.

MANUFACTURE OF PISTON-PACKINGS.

14,644. Specification of Reissued Letters Patent. Reissued May 6, 1919.

Original No. 1,118,784, dated November 24, 1914, Serial No. 542,388, filed February 7, 1910. Application for reissue filed February 4, 1918. Serial No. 215,362.

*To all whom it may concern:*

Be it known that I, FREDERICK WILLIAM LANCHESTER, a subject of the King of Great Britain and Ireland, residing at London, England, have invented certain new and useful Improvements in the Manufacture of Piston-Packings, of which the following is a specification.

This invention relates to an improved method of manufacturing metallic spring piston rings. The usual method of manufacturing such spring piston rings is broadly to take rings of metal of suitable width, cut out a portion of the circumference of the ring, compress the ring till the ends of the gap abut, and turn or scrape the outside of the now non-circular ring to circular form. It will be seen that this method involves at least three steps, thus, initial turning of the ring, cutting the gap, and final turning or fitting. Now it is found in practice that rings manufactured as above suffer from the defect that the pressure exerted by the ring against the cylinder in which it works is not uniform all around its circumference, and further, that it requires much skill on the part of the mechanic, and the expenditure of considerable time, to obtain a satisfactory fit of such rings in their working cylinders.

The object of the present invention is to reduce the number of processes required in the production of spring piston rings, and to obtain a high degree of accuracy, without the employment of hand fitting.

The present invention consists in a method of manufacturing spring piston rings, which includes the use of a former of such a non-circular figure that a ring blank shaped from it, when reduced in circumferential extent by the removal of a portion of the circumference, becomes on compression a circular ring of the required finished size.

The present invention also consists in a method of manufacturing spring piston rings, which includes the use of a former, having the non-circular figure obtained by cutting radially a circular ring inserting a spacing piece in the cut to expand the ring.

The present invention also consists in the method of manufacturng spring piston rings, which includes the use of a former composed of a circular ring, this ring being cut radially at one place, and spring open by a spacing piece inserted in the cut.

Figure 2:
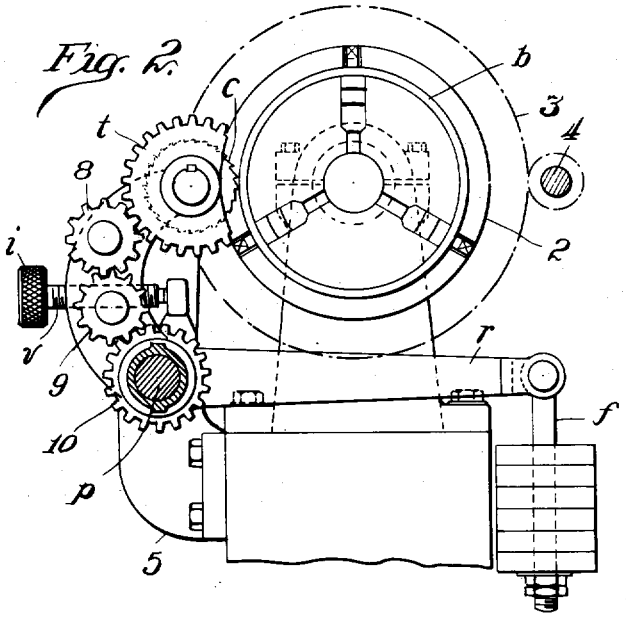
Figure 5:
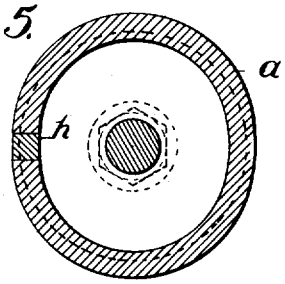
Figure 6:
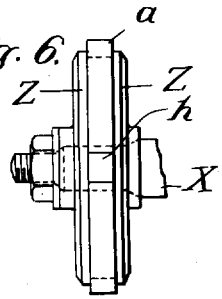
Figure 3:
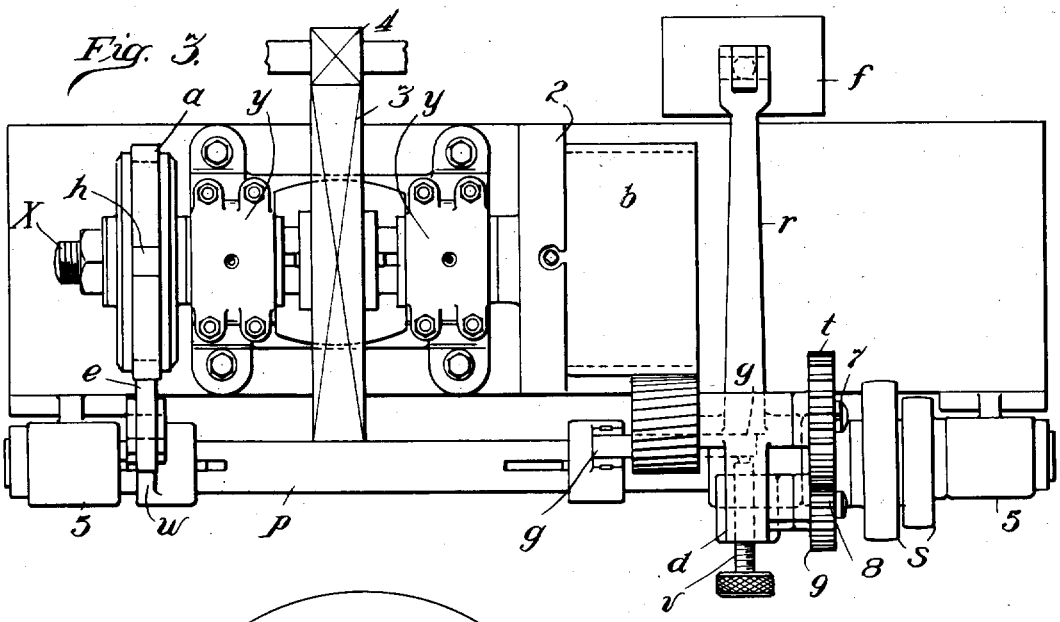
Figure 4:
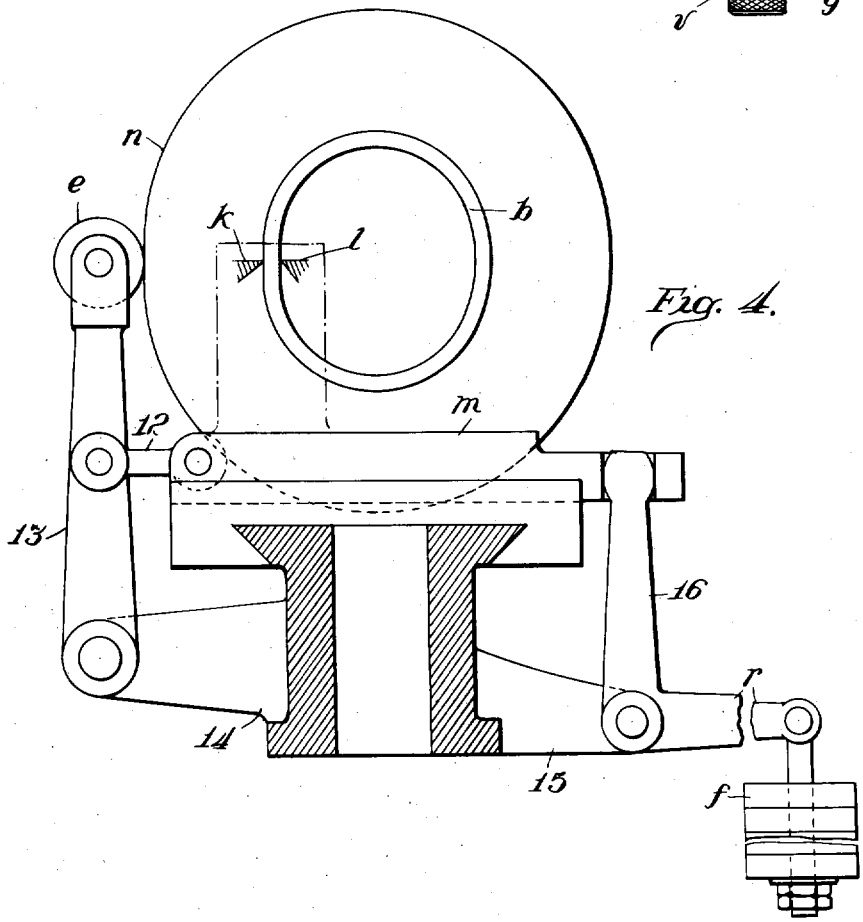

With reference to the accompanying drawings,

Figure 1 is a side view of a form of machine suitable for carrying out the invention, Fig. 2 being an end view, and Fig. 3 a plan of the same, Fig. 4 shows diagrammatically another form of machine, and Figs. 5 and 6 show one method of obtaining the master pattern from which the rings are to be copied.

In carrying the invention into effect a former or master pattern is provided, the shape of which is obtained by the springing outward or spreading of a ring of uniform cross section. To construct the former, a ring is prepared preferably of the same diameter as the outside diameter which the finished ring is required to have. This ring is split radially at one place, sprung open, and supported in its sprung position by a gap piece *h* inserted in the cut, the length of this gap piece being such as to provide that when rings made from this former have their ends sprung together, they shall have the proper degree of springiness. The size of this gap therefore depends upon the nature of the material of the ring, and the outward pressure which the ring is required to give, and the length is best found by experiment. After the gap piece *h* has been inserted, the ring and gap piece are clamped between two disks *z*, *z*. These disks are mounted upon a spindle *x*, which is supported in bearings *y*, mounted on the bed of the copying machine, as shown in Figs. 1 and 3. Also mounted upon the spindle *x* is a chuck 2 which carries the blank *b* from which the rings are made. A gearing 3 and 4 rotates the spindle *x*. To the bed of the machine are fitted bearings 5, 5, which carry a shaft *p*. The shaft *p* is free to rotate or rock in the bearings 5, 5. Upon the shaft *p* is keyed an arm *w*, carrying a roller *e* so positioned that the roller *e* can bear upon the former, composed of the sprung ring *a* and the gap piece *h*. Another arm *g* is also keyed to the shaft *p*. Freely journaled upon the shaft *p* is an arm *d*, having an extension *r* passing across and clear of the bed of the machine, and supporting at its end a weight $f$ as shown in Fig. 2. A set screw $v$ provided in the arm $d$ is adapted to bear against the cranked end of the arm $g$. The effect of this is that the weight $f$ tends to pull down the end of the arm $r$, and to move the arm $d$ toward the center line of the machine. This movement, however, is limited by the screw $v$ bearing against the arm $g$, which is keyed to the shaft $p$. The bearing of the screw $v$ upon the arm $g$ tends to rotate shaft $p$, but this rotation is controlled by the roller $e$ on the arm $w$ coming in contact with the former. It is obvious therefore that if the shaft $x$, and consequently the former, is rotated, the arm $w$ will be moved to and from the axis of the spindle $x$, according as the radius of the part of the former immediately under the roller $e$ is longer or shorter. Upon the end of the arm $d$ is provided a bearing 6 carrying a spindle 7, to one end of which a milling cutter $c$ is attached, and to the other end a gear wheel $t$. Two other gear wheels 8 and 9, carried upon spindles mounted upon the arm $d$ connect the wheel $t$ with the gear wheel 10, mounted upon a sleeve 11, carried freely upon the shaft $p$. Also fixed upon the sleeve 11 are pulleys $s$. If the pulleys $s$ are rotated therefore, rotation will be communicated to the milling cutter $c$.

The action of the apparatus is as follows:—A blank $b$ having been inserted in the chuck 2, and the machine set in motion, the milling cutter $c$ will rotate, removing metal from the blank $b$ as the latter is rotated by the gearing 3 and 4. The depth to which the cutter $c$ can remove metal from the blank $b$ is regulated as before stated by the roller $e$ following the contour of the former, and thereby controlling the position of the arm $g$, and consequently the cutter $c$. Before cutting off the finished rings, however, it is preferable to submit them to a grinding process, to give a more highly finished surface, the grinding may be done in the same or a similar machine, and conveniently by substituting a grinding wheel for cutter $c$. After having their contour completed, the rings parted off from the blank $b$, are cut radially in two places to remove the gap of the required extent, this gap being proportional to the gap piece $h$ inserted in the former.

It will be understood that the inside of the blank may be shaped by a process similar to that by which the outside was cut.

According to another method, the machine may be used as shown in Fig. 4. According to this modification, two cutting tools $k$ and $l$ are mounted upon a slide $m$, the tool $k$ being adapted to turn the outside of the blank $b$, and the tool $l$ the inside of the blank. The slide $m$ is connected by a link 12 to an arm 13 pivoted upon a bracket 14 secured to the bed of the machine. The upper end of the lever 13 carries a roller $e$, as in the first modification of the machine, this roller $e$ bearing upon a former $n$, which may be made up in a similar manner to the former already described. The former $n$ and blank $b$ are mounted upon a spindle, in a similar manner to the first described modification. In the form of machine shown in Fig. 4, the roller $e$ is kept in contact with the former by the weight $f$ upon the end of an arm $r$, pivoted upon a bracket 15 secured to the bed of the machine. The arm $r$ carries a limb 16 having a ball at its upper end adapted to work in a socket upon the slide $m$.

It will be obvious that any suitable known form of copying lathe or milling machine may be used for copying the dummy without departing from the scope of this invention.

Having thus described my invention, what I claim as new and desire to secure by Letters Patent is:—

1. A method of manufacturing spring piston rings consisting in making a former of circular form of the finished size of the piston ring, cutting such former in one place, holding such former open to a non-circular form by means of a gap piece, reproducing said non-circular form in metal, and cutting a piece out of said metal ring of equal length to said gap piece, as set forth.

2. A method of manufacturing spring piston rings consisting in making a circular former of the finished size of the ring, cutting said former in one place, holding open said former to a non-circular form by means of a gap piece, forming a blank in a copying machine from said non-circular former, and cutting out from said blank a portion equal in length to the amount by which said former was held open, as set forth.

3. A blank for a split metal piston ring, which piston ring is normally larger than working size but is round when compressed to the said working size, consisting of a continuous non-circular metal ring comprising a portion having the shape normally assumed by the said split metal piston ring.

4. A split metal piston ring normally having separated ends but round when compressed to working size and comprising that portion of a continuous non-circular blank which is shaped in accordance with the form normally assumed by the said split metal piston ring.

FREDERICK WILLIAM LANCHESTER.